United States Patent [19]
Krieg et al.

[11] Patent Number: 5,238,350
[45] Date of Patent: Aug. 24, 1993

[54] METHOD OF AND AN APPARATUS FOR TAKING UP AND SETTING DOWN, RESPECTIVELY, OF PACKAGE-LIKE ARTICLES

[75] Inventors: Walter Krieg, Brugg, Switzerland; Andreas Wohlfahrt, Haltern, Fed. Rep. of Germany

[73] Assignee: Digitron AG, Brugg, Switzerland

[21] Appl. No.: 716,971

[22] Filed: Jun. 18, 1991

[30] Foreign Application Priority Data

Jun. 20, 1990 [CH] Switzerland ............... 0251/90

[51] Int. Cl.⁵ .................. B65G 15/30; B65G 47/82
[52] U.S. Cl. ..................... 414/278; 414/279; 414/282; 414/786; 414/796; 414/797.2; 414/797.3
[58] Field of Search ............... 414/794.4, 794.5, 796, 414/797.2, 786, 278, 279, 282, 285, 796.2, 797.3

[56] References Cited

U.S. PATENT DOCUMENTS

| | | |
|---|---|---|
| 3,070,241 | 12/1962 | Johnston . |
| 3,206,042 | 9/1965 | Peterson ............... 414/797.2 X |
| 3,664,534 | 5/1972 | Hunter ............... 414/278 X |
| 4,453,874 | 6/1984 | Veldhuizen et al. . |

FOREIGN PATENT DOCUMENTS

| | | |
|---|---|---|
| 1229914 | 12/1966 | Fed. Rep. of Germany . |
| 2631942 | 2/1977 | Fed. Rep. of Germany . |
| 3733461 | 4/1989 | Fed. Rep. of Germany . |
| 140782 | 12/1978 | Japan ............... 414/278 |
| 57-42426 | 3/1982 | Japan ............... 414/797.2 |
| 252807 | 10/1988 | Japan ............... 414/278 |

*Primary Examiner*—Michael S. Huppert
*Assistant Examiner*—Janice Krizek
*Attorney, Agent, or Firm*—Fish & Richardson

[57] ABSTRACT

A horizontally displaceable receiving table for picking up and setting down package-like articles includes a displaceable transporting device, with roller-like pick-up members at its end relative to the direction of travel. The receiving table is displaced towards the articles by a first drive at a velocity which is decreased when the table is in close proximity to the vertical face surface of the articles. The pick-up member is then driven by a second drive such that the pick-up member engages the article and lifts the article onto the receiving table. The receiving table and the transporting device are then driven countercurrently at the same speed until they have substantially moved under the article. The receiving table permits picking up and setting down package-like articles at designated times and locations without damage to the articles.

15 Claims, 8 Drawing Sheets

FIG. 2
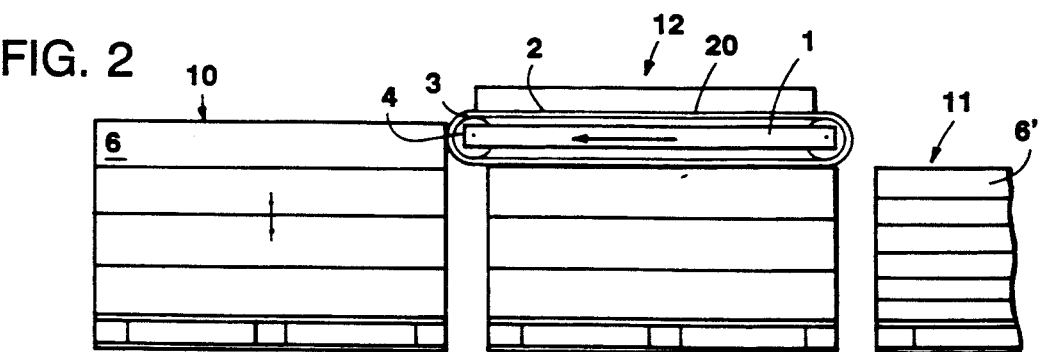
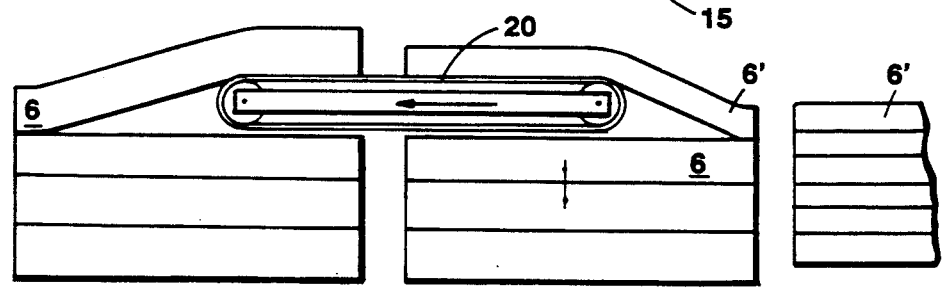
FIG. 3
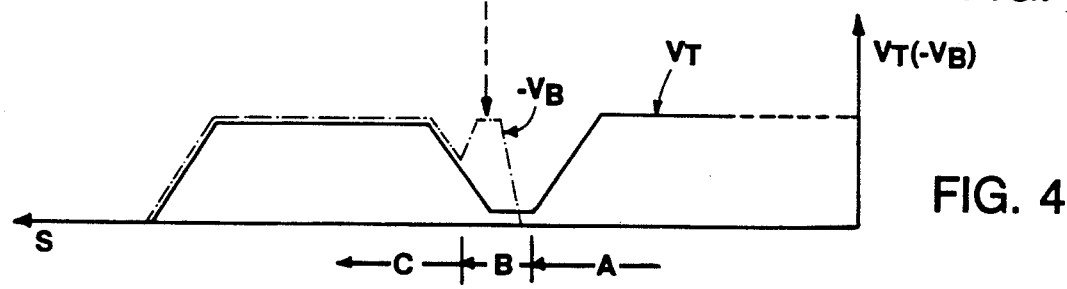
FIG. 4

METHOD OF AND AN APPARATUS FOR TAKING UP AND SETTING DOWN, RESPECTIVELY, OF PACKAGE-LIKE ARTICLES

BACKGROUND OF THE INVENTION

1. Field of the Invention

The present invention relates to a method of taking up and setting down, respectively of package-like articles from and onto, respectively a support by means of a horizontally displaceable receiving table, which receiving table includes at least at its top surface an article transporting device adapted to be driven and includes a roller or guide-roller like pick-up member located at least at its end facing its direction of travel.

The invention relates further to an apparatus for taking up and setting down, respectively package-like articles from and onto, respectively a support.

2. Description of the Prior Art

Such apparatuses are known as so-called depalletizer apparatuses such as, for instance, disclosed in the German specification DE-OS 26 31 942. These apparatuses are used to remove package-like articles such as boxes, crates and similar articles from a storage thereof. A roller is brought into contact with the side of an article, such that the article is lifted up by means of a frictional engagement, gripped by a transporting device and transported off. The problem here encountered is to avoid damaging of the article to be picked up or of its packaging and, on the other hand, to guarantee a defined and safe picking up procedure.

For this reason the pick-up roller of the above mentioned German specification is supported in a horizontal plane elastically at a carriage, so that during a moving of the carriage in the direction of the article, an increasingly rising friction lifting force is exerted onto the article. After the pick-up roller has rotated during a prolonged time span with an increasing friction lifting force in contact with the article, this article is grasped at an undetermined instant of time and position of the carriage, and the roller, which is now is in a biassed state, snaps under the article.

This procedure leads specifically in the case of sensitive articles or packagings, to easily damaging the articles; with at least traces of the frictional engagement remaining upon the articles. Depending on prevailing weights of the articles, the roller which snaps forward can push the articles out of their balance or equilibrium, respectively, and displace them on their support or even damage them. Furthermore, the instant, where the picking up begins, is uncertain, which renders an automatization of the entire procedure quite difficult.

Other suggestions for such apparatuses have also been made, which suggestions entail designs, according to which these apparatuses must be positioned for taking up the articles exactly at the level of the bottom edge of the article (see e.g. U.S. Defense publication T 998,009), which procedure renders an automatization almost impossible. A not extremely precise positioning in the level leads again to a damaging of the article, which additionally in such case cannot be picked up.

Finally, the German specification DE-AS 2 137 827 discloses a depalletizing method for certain shapes of beverage crates and a pick-up apparatus which operates at a frictional contact and has the shape of a ramp, which apparatus cooperates with a lifting device, such to bring the crates into the path of movement of a conveyor which moves continuously forward. This apparatus is designed for very specific crates only and is, furthermore, based on the fact that the crates are displaced relative to their support during the lifting thereof.

None of the apparatuses mentioned above is, furthermore, in a position to set the articles which have been picked up again down at a predetermined location.

SUMMARY OF THE INVENTION

Hence, it is an object of the present invention to provide a method of and an apparatus for picking up a package-shaped article and setting such article down at a predetermined location, which allow a picking up of articles without damaging same and in a manner defined regarding time and location and a corresponding setting down of such articles.

A further object is to provide an apparatus, which is adapted to be applied in an automated collating plant, in which various articles taken out of a storage are collated onto pallets for purchasers in accordance with the respective orders.

A further object is to provide a method, in which the receiving table is displaced by means of a first drive directly up to a vertical face surface of the article to be picked up. The pick-up member at a decelerated speed of displacement, comes into contact with the face surface, whereby the pick-up member is driven by means of a second drive at least after this instance of time such that the article is lifted towards the upper surface of the receiving table by the engagement of the pick-up member with its face surface, and in which the receiving table and the transporting device are thereafter driven countercurrently at a same speed until the receiving table has moved substantially under the article such that the article is in a state to be received by the receiving table.

Yet a further object is to provide an apparatus for taking up and setting down, respectively, package-like articles from and onto, respectively, a support, comprising a horizontally displaceable receiving table which includes at its top surface an article transporting device adapted to be driven, by means of which the article arranged thereupon is transportable in the direction of displacement of the table and in the opposite direction between two ends of the table, and comprising a roller or guide roller, respectively, like pick-up members arranged at the respective ends of the table and also adapted to be driven and adapted further to engage vertical surfaces of the article to be picked up in order to lift the article up to the level of the table, whereby a first drive for displacing the table and at least a second drive for the pick-up members and the transporting device, respectively, are foreseen, which drives are connected to a drive control adapted to control each drive in dependence from the position of the receiving table or article, respectively, and from its set down location.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 2 is the illustration of the operation at an arrangement having two receiving locations and a set down location therebetween for limp articles;

FIG. 3 is an illustration of the arrangement of FIG. 2 in a second phase of operation;

FIG. 4 is a speed-path-diagram of the arrangements according to FIGS. 2 and 3;

DESCRIPTION OF THE PREFERRED EMBODIMENTS

Figure 1A:
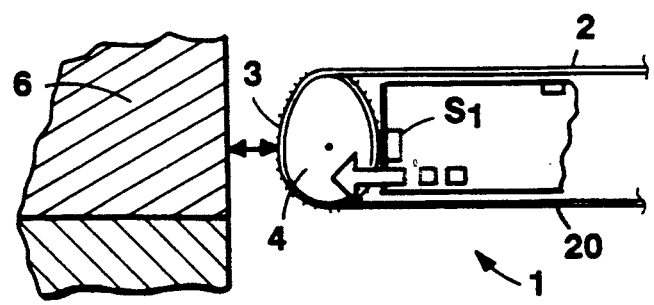
FIGS. 1A–1E schematically illustrate the picking up procedure of a rigid article in five phases.
Figure 1B:
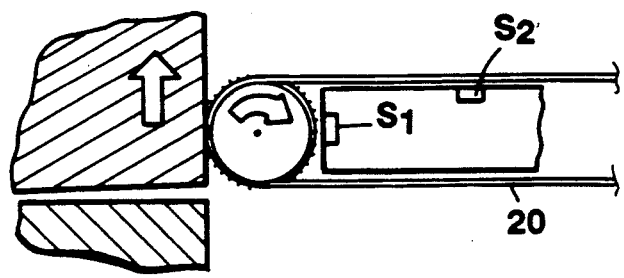
Figure 1C:
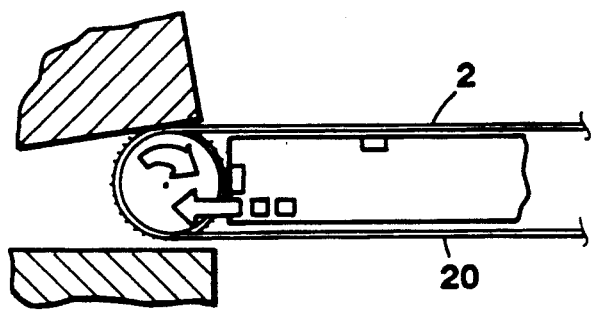
Figure 1D:
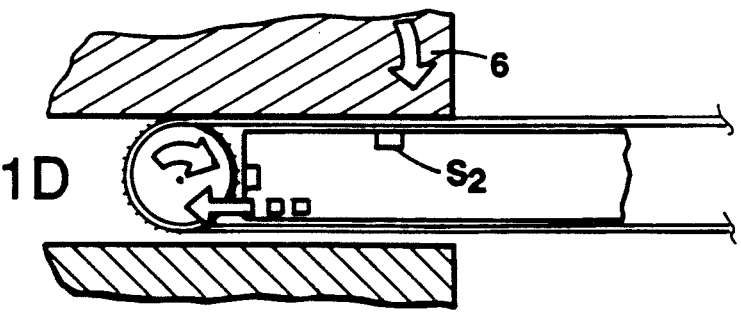
Figure 1E:
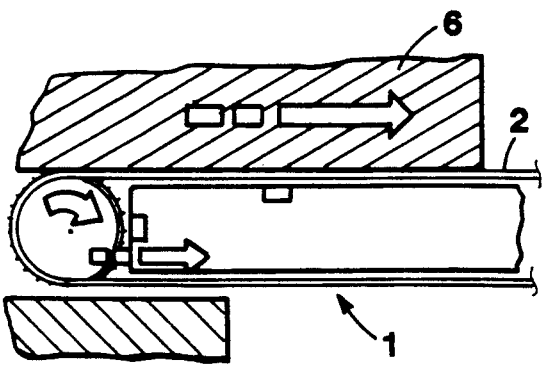

Based on FIGS. 1 to 4 the principle of the operation of the pick-up procedure in accordance with the invention shall be explained firstly without entering into structural or design details. These details will be explained further below, based on further figures.

With reference to FIG. 1, firstly the picking up procedure will be explained, based on a rigid article 6 and proceeding in five phases. The individual phases are identified in accordance with their sequence by the letters A to E. FIG. 1 shows the receiving table 1 with a transporting device 2 for the articles located at its upper side and with a pick-up member 3 located at its front side. The receiving table 1 can be displaced horizontally, and a first drive is foreseen for this displacing. The transporting device 2, which is present in form of one or a plurality of belts and also the pick-up member 3 is driven here, by a second drive, the pick-up member 3 being formed by the corresponding guide rollers 4 (see e.g. FIG. 5).

In the first phase A the receiving table 1 approaches the article 6 to be picked up at a normal speed. When the receiving table 1 gets close to the article 6, the speed of the receiving table 1 is decreased. In case the articles 6 are not picked up at a normative location, their position is sensed by means of a proximity switch $S_1$, which by means of a corresponding controlling of the first drive, the speed of the displacement of the receiving table 1 is reduced. Therefore, during phase B the receiving table 1 contacts the face surface of the article 6 at a small speed. At the same time the pick-up member 3 is driven by means of the second drive and specifically at a relatively high speed. If now the pick-up member 3 comes to contact the face surface of the article 6, this article 6 is raised speedily due to friction before it has been noticeably shifted by the receiving table 1 relative to its support. If the article in phase C has reached with its front side the level of the table, the speed of the receiving table is again increased and at the same time the transporting device 2 is driven countercurrently to the receiving table 1, and at the same speed such that the receiving table 1 moves under the article without the article being displaced relative to its support. If the table has moved that far under the article that it lifts off its support, which in case of rigid articles happens generally after the table has been moved beyond its center (phase D), the direction of movement of the receiving table 1 can be reversed and the article can be displaced with the transporting device 2 completely onto the table (phase E). This point of return can also be set by means of a sensor $S_2$, which responds as soon as the article 6 lies on the receiving table and thus has been lifted from the support. On the other hand, it is also possible, (and such is specifically advantageous in case of limp articles), to stretch the phase C of the moving under the article up to the end of the article such that in case of normed articles or packagings, respectively, the sensor $S_2$ is not necessary. In order to arrive at a time saving operation it can, however, also be foreseen to move only so far under the article 6 until it rests by its weight substantially on the receiving table and then to already initiate phase E.

The corresponding procedure in case of picking up limp articles, such articles may be e.g. reams of paper is illustrated in FIGS. 2 to 4. The collating plant illustrated therein includes two pick-up locations 10, 11 and the articles 6, 6' to be picked up, in this example reams of paper, which are stacked on pallets in a sorted manner, are to be fed to the two pick-up locations. Between these locations a set down location 12 is arranged, at which the receiving table sets the articles removed selectively at the pick-up locations down onto a pallet 15 of a purchaser. The receiving table 1 is displaced in a horizontal plane between mentioned three locations, whereby the stack of articles is lifted by means of lifting devices up to the respective height level. FIGS. 2 and 3 illustrate two states of the operation, in which states the receiving table 1 is taking up an article 6 at the pick-up location located at the left end while simultaneously setting an article 6', which previously had been picked up at the right pick-up location 11, down onto the pallet 15 of a purchaser. Initially only the picking up procedure shall be considered. Hereto attention is drawn to the speed-travel-diagram in FIG. 4, in which the advancing speed $V_T$ of the receiving table 1 and the countercurrent speed $-V_B$ of the transporting device or pick-up member, respectively, are illustrated in dependence upon the position of the front edge of the table. It has been described previously that the speed $V_T$ of the receiving table is decreased when it comes close to the article 6 to be picked up (phase B). At the same time the rotational speed of the roller 4 of the pick-up member 3 ($=V_B$) is increased to a first maximum value in order to speedily lift the front side of the article by friction up to the level of the receiving table. Accordingly the articles in the short time span necessary for this movement are substantially maintained in horizontal position relative to the support due to the slow forward motion of the receiving table. The slowly approaching of the receiving table 1 in combination with the relatively high speed rotation of the pick-up member 3 guarantees that the lifting of the front side of the article proceeds within a very short time span and accordingly without any displacing of the article. Also at the subsequent moving under the article 6 no such relative displacement thereof relative to the support occurs because the receiving table 1 and its transporting device 2 are driven countercurrently (in opposite directions) at the same speeds $V_T = -V_B$ (phase C).

The described picking up procedure is accordingly specifically suitable for sensitive articles such as e.g. a limp ream of paper wrapped into a wrapping paper. It is specifically avoided that the wrapping paper tear during the picking up procedure or that the paper sheets are upset, buckled or generally damaged. If the articles 6, 6' such as illustrated in FIGS. 2 and 3 are supplied to the picking up locations in such a manner that their front edges are located within a certain tolerance range, the picking up procedure can be controlled without the use of sensors at the receiving table 1 in a travel dependent manner.

FIG. 3 discloses, furthermore, the setting down procedure, which may be combined with the pick-up procedure for a next following article, but also may proceed for itself alone. Hereto the receiving table 1 moves over the set down location 12. When the receiving table has arrived there, the transporting device 2 is put in operation countercurrently and with the same speed ($V_T = -V_B$), such that the article is set down at the set down location exactly and without any relative displacement relative to the support. In the illustrated embodiment, the setting down of an article 6 onto the pallet of a purchaser which has been previously picked up proceeds simultaneously with a picking up of a new article 6'. This is sensible and possible because at both procedures the traveling speed $V_T$ of the receiving table 1 and the driving speed $V_B$ of the transporting device 2 are countercurrent. By means of this an economic collating of the pallet 15 of the purchaser is arrived at.

Figure 5:
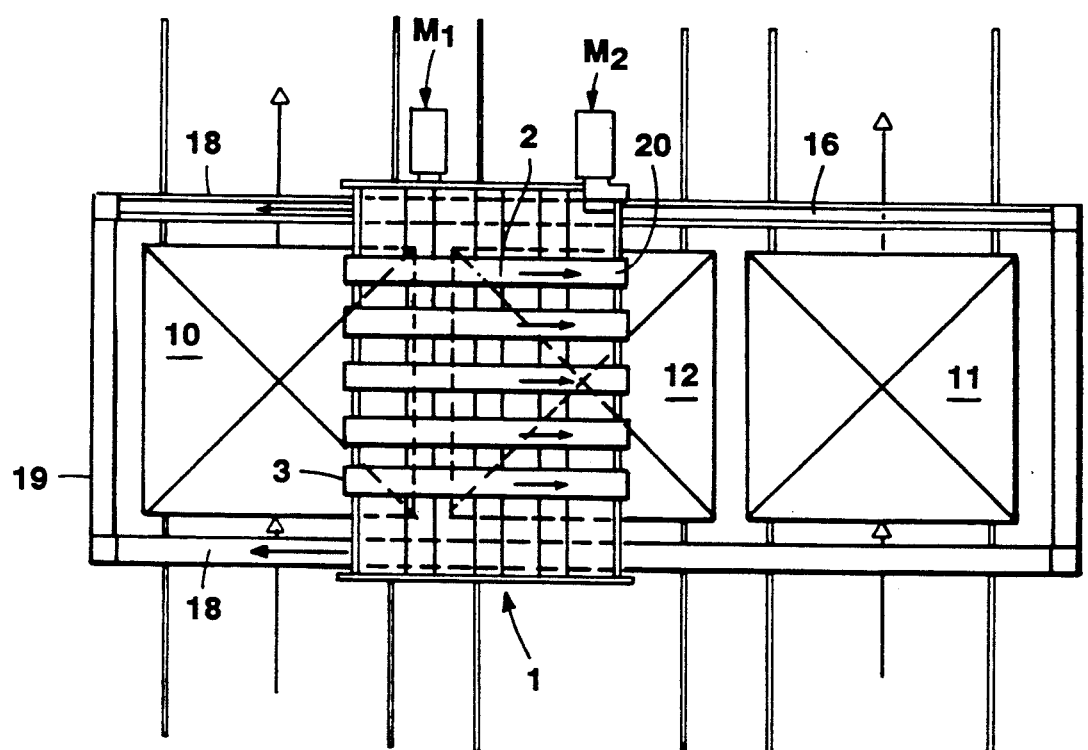
FIG. 5 is a top view of a concrete embodiment of the arrangement according to FIGS. 2 and 3.
Figure 6:
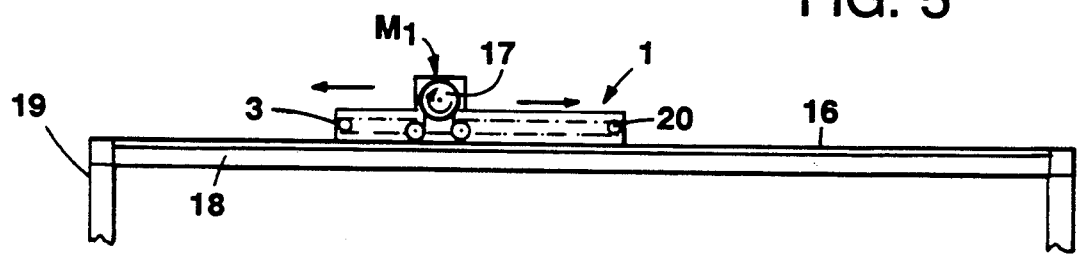
FIG. 6 is a schematic side view thereof.

FIGS. 5 and 6 illustrate a concrete embodiment of the described apparatus. A receiving table 1 is guided in horizontal rails 18 on a bridge 19, which extends over the two pick-up locations 10, 11 and over the set-down location 12, as well, which rails 18 define one level of operation. Lifting devices are foreseen at the pick-up locations 10, 11 and at the set-down location 12, to lift the respective uppermost article to the operating level. This may proceed according to common procedures by means of light barriers. The pick-up locations 10, 11 are alternately provided with purely sorted pallets with the articles to be collated, which are set down onto a pallet of a purchaser at the set-down location 12 in accordance with above described procedure. The receiving table is driven by a controllable servomotor M 1, which coacts via a driving wheel 17 with a toothed belt 16 which extends along one of the rails 18. A second servomotor M 2 is foreseen as a drive for the transporting device 2 and the pick-up members 3, which are formed by circulating belts 2. Thereto the servomotor M 2 drives belt guide pulleys 20 at the one side. The belts 2 include a coating having a high coefficient of friction, for which e.g. a polyurethane material of the trademark "Linatex" is suitable. The belts 20 running around the guide pulleys operate as pick-up members 3, which engage by means of frictional force the face surface of the articles. They act, however, at the same time, at the upper side of top side, of the receiving table 1 as transporting device 2 for displacing the articles along the upper side of the table 1.

The control of the motors M 1, M 2 proceeds at preset positions of the packages via a travel-measuring sensor combined with the motor M 1, of which the signals are evaluated as control value for the respective states of the operation. In those cases where the positions of the articles are not preset, the control proceeds such as described by means of proximity sensors.

Accordingly, the described receiving table concurrently performs a plurality of functions, in that it serves as "gripper" for a picking up of articles from a stack thereof, thereafter serves as a transporting table for displacing the articles from the pick-up location to the set-down location and finally as "shoving off means" of the articles at the set-down location, whereby all functions proceed under careful treatment of the article.

Based on FIGS. 7 to 10 it becomes obvious that the structural design of the receiving table 1 can be modified in various manners and can be designed such to suit the articles to be picked up.

During the preceding description one has proceeded without a specific entering thereinto, that the level of the receiving table 1 is set during the picking-up and setting-down procedure in such a manner that its bottom side is located at a distance from the respective support (see FIGS. 1 to 3). This is necessary in order to avoid a damaging of the support or the respective next lower article, because obviously the movement of the belts 20 at the bottom side of the table is added to the speed of travel of the table and accordingly a large friction relative to the support could arise.

Figure 7:
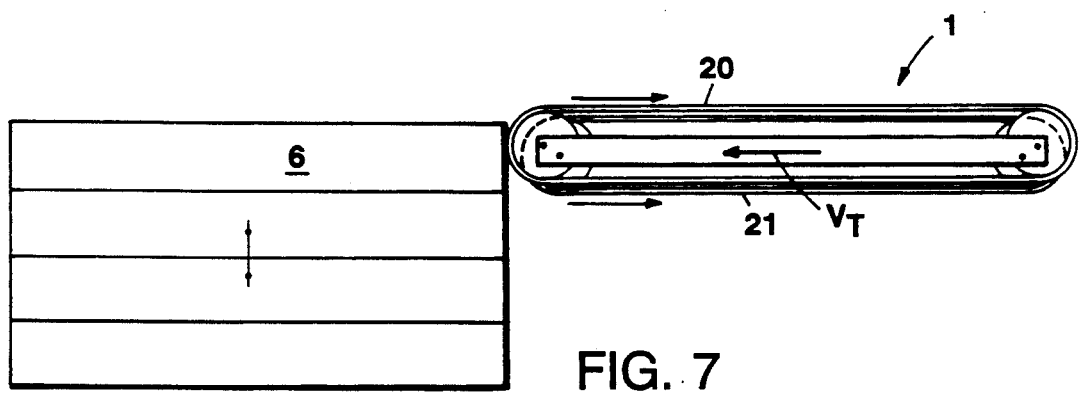
FIG. 7 illustrates a further embodiment of the receiving table at a first phase of operation.
Figure 8:
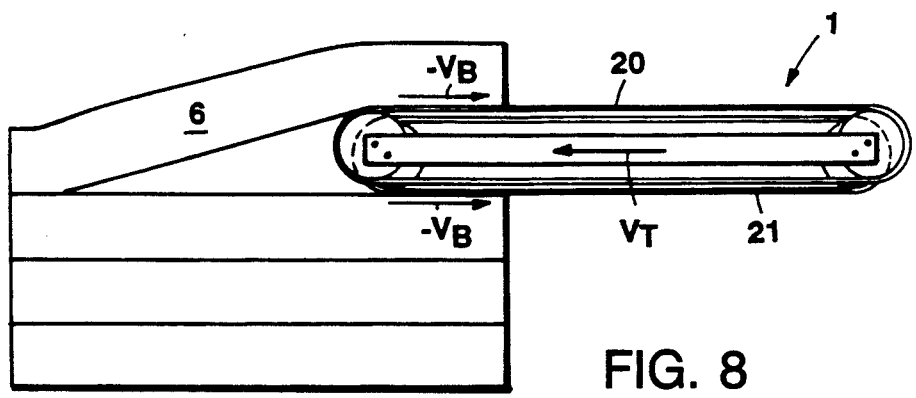
FIG. 8 is a view of the embodiment of FIG. 7 in a second phase of operation.

FIGS. 7 and 8 illustrate an embodiment, in which supporting belts 21 are located at the bottom side of the table and displaced slightly inwards and downwards, the belts being driven by the same drive which drives the belts 20, but in a countercurrent direction. If during the picking-up or setting-down procedure, the bottom side of the receiving table 1 contacts the support (on purpose or not on purpose), the supporting belts 21 move without a relative displacement on top of the support and avoid a damaging of the support. This allows proceeding with the adjustment of the level of the receiving table 1 or the articles 6, respectively, relative to each other within large tolerances of measure.

Figure 9:
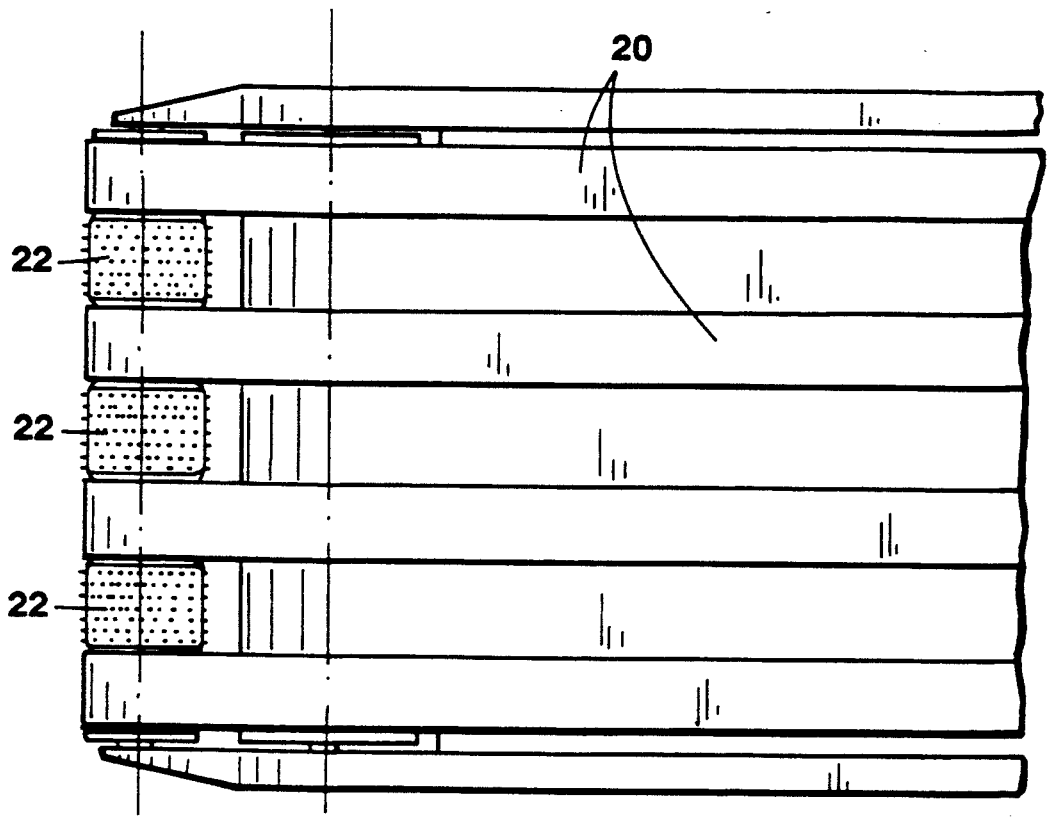
FIG. 9 illustrates a third embodiment of the receiving table designed partly in a top view.
Figure 10:
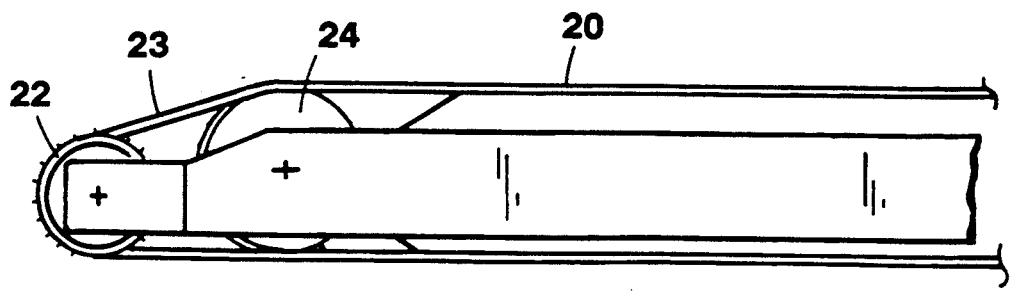
FIG. 10 illustrates a side view of the embodiment according to FIG. 9.
Figure 11:
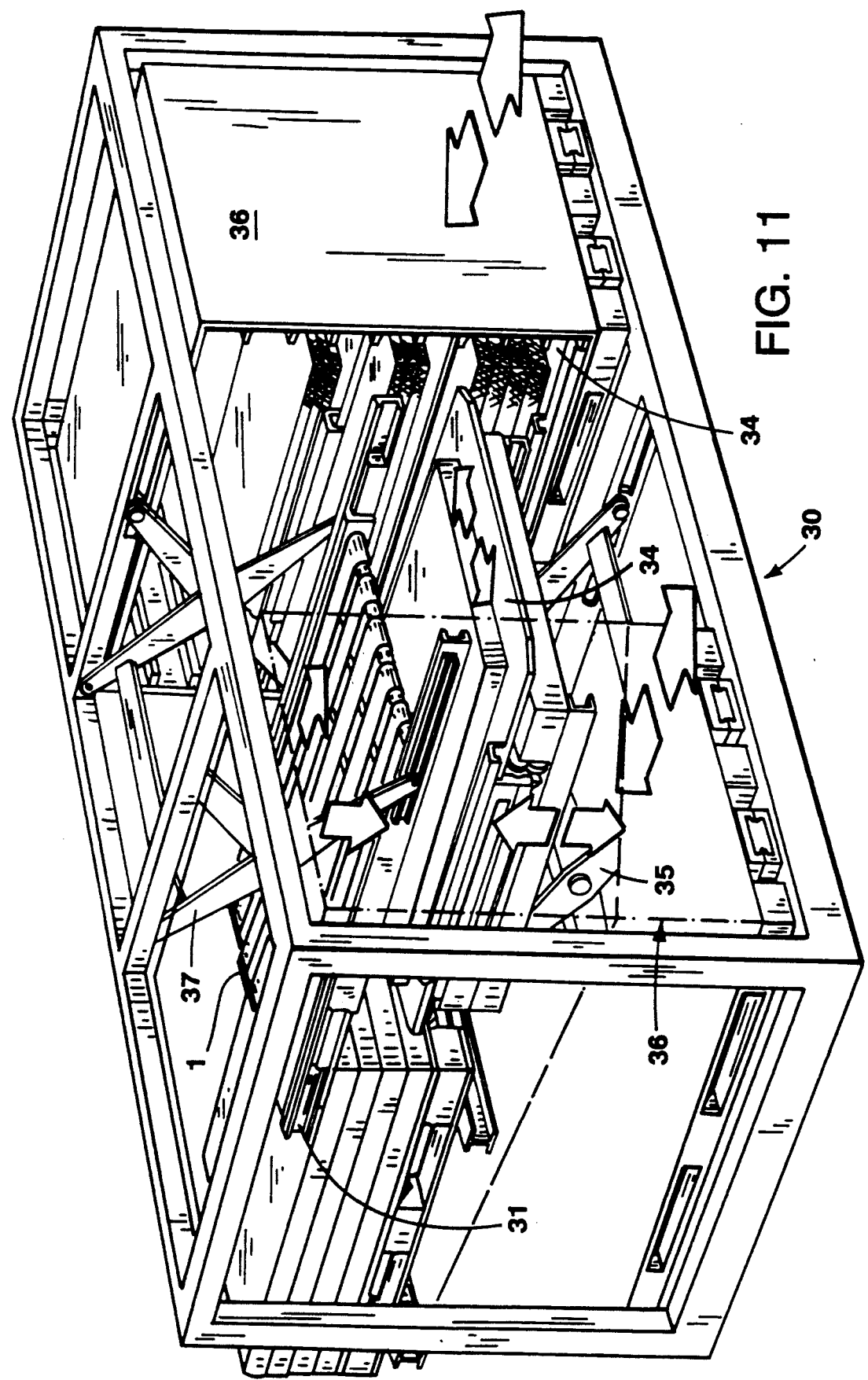
FIG. 11 is a perspective view of the receiving basket of a collating plant in a storage house having shelves, which receiving basket has a receiving table mounted therein.

In FIGS. 9 and 10, the front part of a receiving table 1 is illustrated, with the pick-up members 3 being separated from the transporting device 2. The transporting device 2 is again formed by belts 20, which are guided around at the face surface. Rollers 22 are located between the belts 20, with the rollers being equipped with spikes. Such spiked rollers 20 are specifically suitable as pick-up members for rigid articles such as wooden crates or like similar articles which have a higher weight. They may be elastically supported in the direction of travel. The picking-up procedure proceeds in such case as follows. During the decreased speed of travel the rollers 22, which in this instance still are at rest, are brought to contact the face surface of the crates to be picked up. The spikes are thereby forced into the article, the crate, whereafter the rollers 22 for the picking up of the article are set in motion. The rollers are thereby subject to a spring action, by means of which it is guaranteed, that their engaging at the face surface remains during the picking-up procedure. The rest of the procedure proceeds in a manner already described above. In order to decrease the height of the lift it is furthermore possible to have a ramp 23 at the front part of the receiving table such that the diameter of the spiked rollers can be selected to be smaller than the level of the table. This is arrived at by means of additional rollers 24 having a larger diameter which are located behind the spiked rollers 22, with the belts 20 running over these larger diameter rollers 24.

It is quite obvious that, specifically with such a design, the picking up members 22 may have a separate drive driven only during the picking-up procedure proper (phase B in FIG. 1 or 4).

The applications described up to now refer to a stationary collating plant, to which respective cleanly sorted article pallets are fed to and from a storage area, with respective articles being transferred onto a pallet of a purchaser. Such collating plants are specifically useful for so-called "fast-mover"-products. Such products are understood as a small article assortment, of which most purchases are composed.

Figure 12:
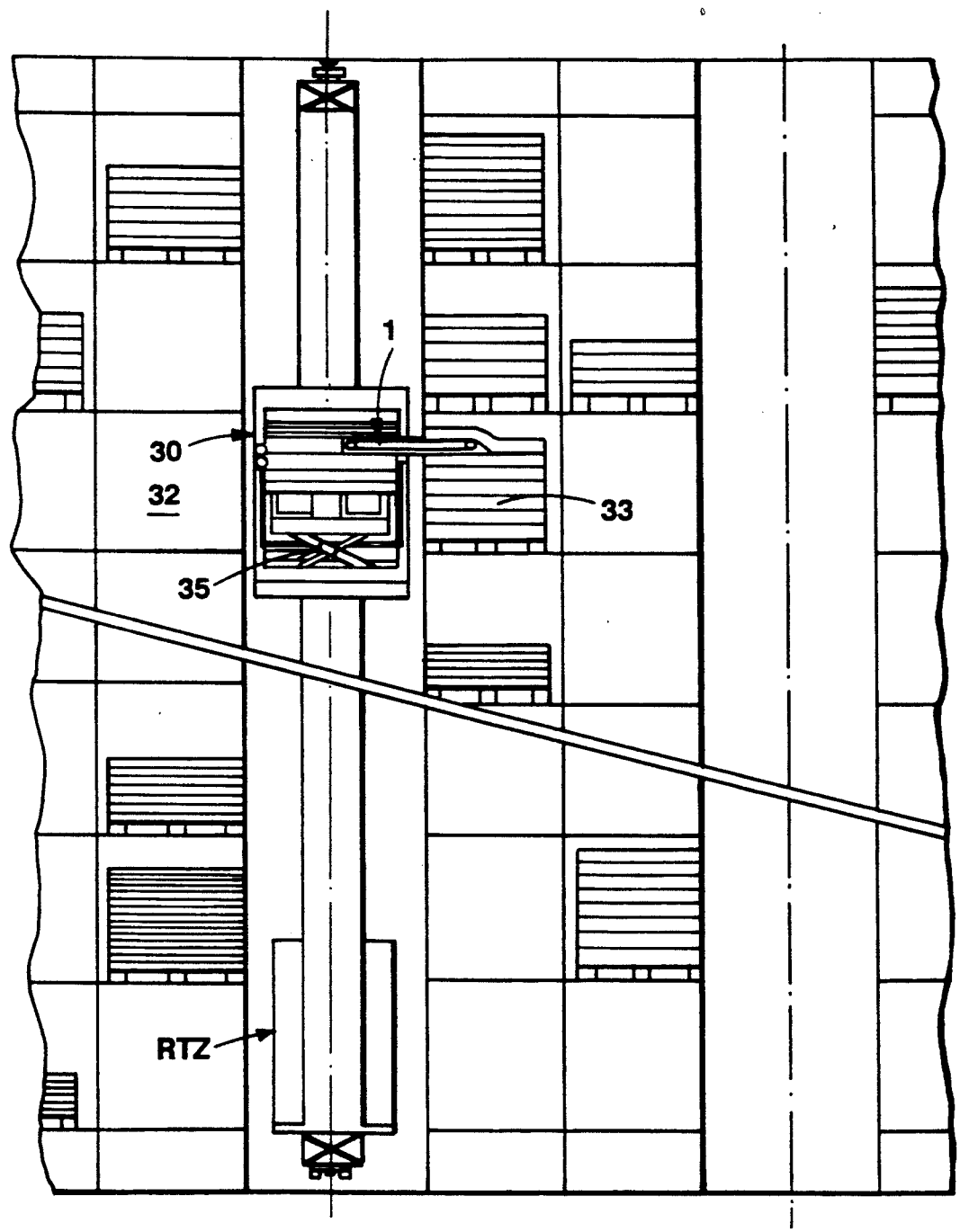
FIG. 12 illustrates the receiving basket of FIG. 11 in operation with a transporting train operating between the shelves.

In a further application based on FIGS. 11 to 14 an inventive plant is described, in which the collating for a saving regarding corresponding transporting routes is made directly in a storage area having highly stacked shelves. The articles are thereby taken out of the shelves directly by a collating plant 30 positioned on a shelf transporting vehicle RFZ, such as illustrated in FIG. 12. In a corresponding manner the collating plant 30 may also be mounted on a guided wire controlled transporting vehicle without a driver, a so-called FTS.

The collating plant includes a receiving table 1 of a structure already described, with the receiving table being extendable via telescoping rails 31 (FIG. 11) at both sides into the shelves 32, 33 of this storage plant having highly stacked shelves. The receiving table 1 is furthermore supported by means of a lifting device 37 in the collating plant in a height level adjustable manner.

The shelves 32, 33 form accordingly the previously mentioned receiving locations and the picking up of the articles (here again limp reams of paper) proceeds in a manner as already described above. The setting-down location is formed now by an article carrier 34 in the collating plant, onto which the articles are set down from the receiving table 1. This can proceed simultaneously with the picking up of a new article out of a shelf such as already indicated in FIG. 3. The article support 34 stands in turn onto a lifting device 34 and can be pushed from this one into laterally located containers 36, which after the collating has been completed are removed out of the collating plant.

Figure 13:
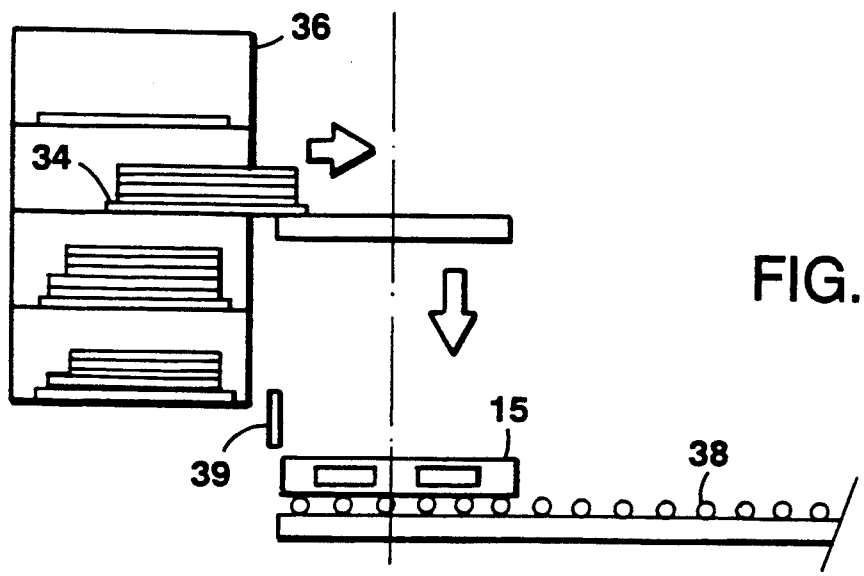
FIG. 13 illustrates the removing of collated article supports out of the receiving basket.
Figure 14:
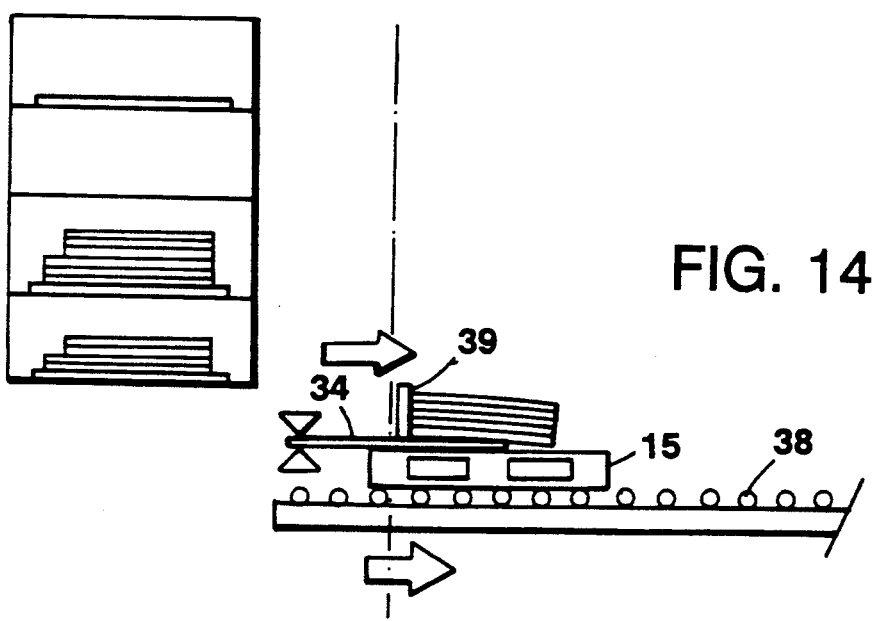
FIG. 14 illustrates a taking over of the collated articles from an article support onto a standard pallet.

The operation of this plant is now as follows: The shelf transporting vehicle moves in accordance with a purchaser's order towards various shelves and retrieves by means of the receiving table 1 a respective desired number of articles, which are set down onto an article carrier in a manner described above. For this retrieving the receiving table 1 is adjusted by means of sensors and the lifting plant 37 to the height level of the uppermost article and the article carrier 34 is brought into the corresponding height level such that a common plane of operation is formed, such as illustrated in FIGS. 2 and 3. The picking up and setting down of the articles proceeds then in accordance with the described method. When the collating for a given article carrier 34 is terminated, it is moved laterally into one of the containers 36. Thereafter, a further article carrier 34 is taken out of this container and displaced to the setting down location, whereafter the collating procedure proceeds further. When the containers 36 have been filled with correspondingly collated article carriers 34, the shelf transport vehicle moves to a retrieving location, which is schematically illustrated in FIGS. 13 and 14. The filled containers 36 are exchanged with empty containers, and the collating procedure can be immediately continued.

The article carriers of the filled containers 36 are, on the other hand, retrieved out of the containers and set down onto a pallet 15 of a purchaser, such as illustrated in FIGS. 13 and 14. This pallet of the purchaser is supported onto a transporting roller arrangement 38, which may be driven in synchronism with a pushing off member 39, while the article carrier is arrested. In this manner the collated articles are pushed together from the article carrier 34 onto the pallet of the purchaser without the latter moving relative to the articles (FIG. 14).

This kind of collating of articles, specifically of reams of paper, is specifically suitable for orders which are composed of a large number of various articles, such that the transporting routes in the storage plant are held to be as short as possible.

Figures 15, 16:
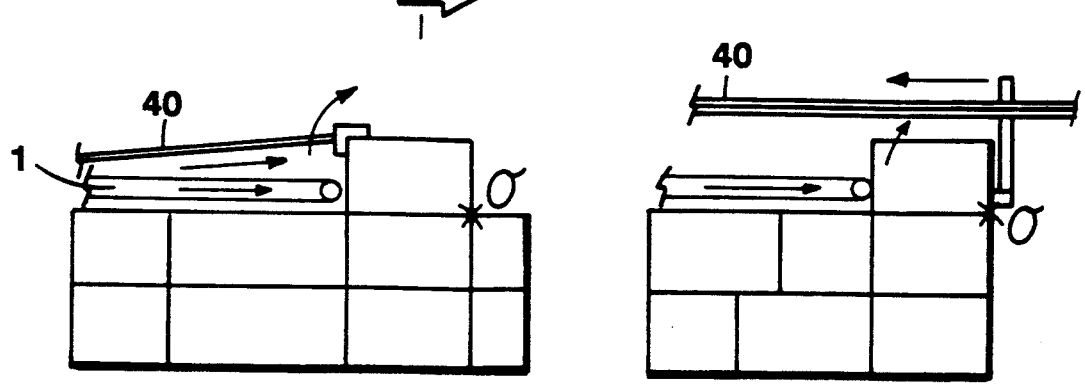
FIG. 15 is an illustration of a first auxiliary device for the receipt of heavy articles.
FIG. 16 is an illustration of a second auxiliary device for the receipt of articles which are prone to slippage.

The picking up apparatus which has now been described based on a plurality of examples and the corresponding operation have until the now known structures or procedures, a plurality of advantages. The receiving table can be moved towards the face side of the articles, without the necessity of having exact positions regarding the vertical or horizontal position. The tolerances of movements during the picking-up procedure can accordingly remain relatively large, without negatively influencing the function or without a damaging of the articles to be picked up. Because relative displacements between the articles or between the receiving table and the articles are avoided, no large forces act onto the articles, which can lead to upsetting or crushing the articles or to other damages thereof by an influence of forces. Furthermore, it is avoided that the pick-up member rotates in a slipping manner during a prolonged time at the face surface of the article, such that the member could be damaged by a mechanical action or a heat action. The articles which have been picked up are transported on the receiving table and are set down from the same at a definitely defined location, such that a repeated reloading of the articles between storage and pallet of the purchaser no longer occurs. Corresponding plants may be mounted stationary or displaceably as well on transporting vehicles operating between shelves or on transport systems operating without driver. If articles are to be collated which are difficult to be picked up, such as heavy articles or that they are apt to easily slide on their support, the described receiving table may be combined with auxiliary devices. In FIG. 15 an auxiliary device for specifically heavy articles which adhere strongly to their support is illustrated schematically. An auxiliary tilting device 40 acts together with the receiving table 1 onto the upper front edge of the article, which exerts relative to a tilting-location 0, a moment onto the article and accordingly supports the action of the pickup member. FIG. 16 illustrates a holding device 41, which may be applied in case of articles which are apt to slide easily. It grips behind the respective last article of a row of articles such that it is kept back against the action of the receiving table 1. This guarantees that a sufficient friction between the pick-up member and the article to be picked up is produced, such that the latter can be lifted at its front side. Preferably the arresting device acts onto the area of the tilting-point 0 of the last article of a row of articles.

While there are shown and described present preferred embodiments of the invention, it is to be distinctly understood that the invention is not limited thereto, but may be otherwise variously embodied and practiced within the scope of the following claims.

We claim:

1. A method for taking up and setting down a package-shaped article having a vertical surface with a bottom edge by means of an apparatus including a receiving table having a top surface and first and second opposite ends, the receiving table comprising: at the top surface of the receiving table, an article transporting device to transport the package-shaped article between the first and second opposite ends of said receiving table, and means for lifting the package-shaped article, comprising at least one roller arranged at one or more of the first and second opposite ends of the receiving table and a second drive for actuating the lifting means, the apparatus also including a first drive for horizontal displacement of the receiving table in directions perpendicular to the first and second opposite ends, the method comprising the steps of:
positioning the receiving table in front of a package-shaped article to be taken up, with the at least one roller of the lifting means facing an opposed vertical surface of the package-shaped article to be taken up;
displacing the receiving table horizontally in a first direction toward the package-shaped article to be taken up at a first predetermined velocity, in a manner to cause the at least one roller of the lifting means to move toward a contact with the opposed vertical surface of the package-shaped article to be taken up,
decreasing the velocity of horizontal displacement of the receiving table in the first direction from said first predetermined velocity to a second predetermined velocity, before said lifting means comes into contact with said vertical surface,
actuating the second drive to cause the at least one roller of the lifting means during contact of said lifting means with said vertical surface to exert a vertically directed force on the vertical surface; and,
when the bottom edge of the package-shaped article is lifted above the top surface of the receiving table, continuing horizontal displacement of the receiving table in the first direction at an increased third predetermined velocity that is greater than the second predetermined velocity, and simultaneously operating the article transporting device at the third predetermined velocity in a second direction, opposite to the first direction of displacement of the receiving table;
whereby the package-shaped article remains stationary relative to an original position, with the receiving table moving thereunder,
said method further comprising the steps of:
displacing the receiving table in a horizontal direction across a travel surface toward a set-down location, while maintaining the article transporting device stationary relative to the top surface of the receiving table,
upon arrival of the receiving table at the set-down location, actuating the article transporting device to displace the package-shaped article disposed thereupon, the velocity of the article transporting device relative to the top surface being substantially the same as but in an opposite direction to the velocity of the receiving table relative to the travel surface,
whereby the package-shaped article remains horizontally stationary relative to the set-down location and the receiving table moves away thereunder.

2. The method of claim 1 further comprising:
setting the second drive into operation not later than the moment when the at least one roller of the lifting means comes into contact with said vertical surface of the package-shaped article, whereupon the second drive is operating both the at least one roller of the lifting means and the article transporting device at the second predetermined velocity, and
when the bottom edge of said vertical surface is lifted above the top surface of said receiving table, causing the second drive to operate the article transporting device at the third predetermined speed.

3. The method of claim 1 further comprising:
displacing the receiving table alternately between at least one article pick-up location and an article set-down location.

4. An apparatus for taking up and setting down a package-shaped article with an essentially vertical surface, said apparatus comprising:
a horizontally displaceable receiving table adapted for displacement between a set-down location and one or more take-up locations, said receiving table having a top surface and first and second opposite ends;
over said top surface of said receiving table, an article transporting device adapted to transport the package-shaped article across said receiving table between said first and second opposite ends of said receiving table;
means for lifting the package-shaped article comprising lifting members arranged at each of said first and second opposite ends of said receiving table, each said lifting member comprising at least one roller adapted for engaging said essentially vertical surface of said article to be taken up in order to lift the package-shaped article up to the level of the top surface of said receiving table;
a first drive for displacement of said receiving table;
at least one second drive for driving said lifting members and said article transporting device;
a drive control means connected to said first drive and said at least one second drive, said drive control means controlling each of said first and second drives in response to the position of said receiving table, said drive control means including means for adjusting the speed of said article transporting device and displacement of said receiving table so that during taking up and setting down of the package-shaped article, the package-shaped article is not displaced horizontally with respect to the take-up or the set-down location.

5. The apparatus of claim 4 wherein said receiving table further comprises a carriage adapted for displacement along rails extending between the take-up and setdown locations.

6. The apparatus of claim 4 wherein said apparatus further comprises means for adjustment of relative vertical position between said top surface of said receiving table and the support.

7. The apparatus of claim 4 wherein said receiving table is adapted for displacement between two outer take-up locations and a set-down location located therebetween.

8. The apparatus of claim 4 wherein said article transporting device further comprises one or more transporting belts running across said top surface of said receiving table, and guide rollers for said transporting belts disposed at said first and second opposite ends of said receiving table, and said lifting means comprises at least a portion of said article transporting device in regions of the first and second opposite ends of said receiving table.

9. The apparatus of claim 8 wherein said lifting means comprises a portion of said transporting belts in regions of the first and second opposite ends of said receiving table and said transporting belts comprise an elastic coating having a high coefficient of friction.

10. The apparatus of claim 8 wherein said second drive is adapted to drive said guide rollers and to drive said transporting belts via said guide rollers.

11. The apparatus of claim 7 wherein said receiving table is arranged on a stationary rail plant extending over the two outer take-up locations and the set-down location located therebetween, and said apparatus further comprises article feeding devices at the take-up locations and article removing devices at the set-down location.

12. The apparatus of claim 4 wherein said apparatus further comprises a transport vehicle upon which said receiving table is arranged, said transport vehicle being adapted for displacement in a warehouse alley between walls of shelves, the take-up locations being defined by the shelves, and said receiving table being displaceable on said transport vehicle to the shelves in order to pick up articles on a shelf and set them down at the set-down location.

13. The apparatus of claim 12 wherein said transport vehicle comprises at least one container to receive a plurality of articles, said container adapted to be removed from said transport vehicle, said container comprising a plurality of article support devices, and said apparatus further comprises displacing means for moving each of said plurality of article support devices between the set-down location and said container, whereby said apparatus is adapted for moving an article, by means of said receiving table, from a take-up location to said article support device at the set-down location, and thereafter moving said article support device together with the article into said container.

14. The apparatus of claim 8 wherein said drive control means causes said first drive to decelerate displacement of said receiving table while said lifting members are engaged with the vertical surface of an article to be picked up.

15. The apparatus of claim 8 or 14 wherein said drive control means causes said second drive to accelerate the speed of said lifting members while said lifting members are engaged with the vertical surface of an article to be picked up.

* * * * *